United States Patent [19]

Woodring et al.

[11] 4,287,263

[45] Sep. 1, 1981

[54] HEAT BONDABLE ASPHALTIC SOUND DEADENER

[75] Inventors: William J. Woodring, Bound Brook, N.J.; James A. Gulino, Joliet, Ill.

[73] Assignee: GAF Corporation, New York, N.Y.

[21] Appl. No.: 66,612

[22] Filed: Aug. 15, 1979

Related U.S. Application Data

[63] Continuation of Ser. No. 905,349, May 12, 1978, abandoned.

[51] Int. Cl.³ .................... B32B 11/02; B32B 11/04; B32B 11/08
[52] U.S. Cl. ............................ 428/489; 106/281 R; 106/DIG. 3; 181/286; 181/290; 181/293; 181/294; 428/138; 428/324; 428/468; 428/523
[58] Field of Search .................. 106/281 R, DIG. 3; 181/286, 290, 292, 293, 294; 428/137–139, 324, 363, 424, 450, 454, 461, 468, 489, 523

[56] References Cited

U.S. PATENT DOCUMENTS 2,009,811  7/1935  Olsen ........................ 106/DIG. 3

FOREIGN PATENT DOCUMENTS

| 721237 | 11/1965 | Canada | 428/489 |
| 784029 | 4/1968 | Canada | 428/489 |
| 1002415 | 8/1965 | United Kingdom | 181/294 |
| 1039711 | 8/1966 | United Kingdom | 428/489 |
| 1221949 | 2/1971 | United Kingdom | 428/489 |
| 1221950 | 2/1971 | United Kingdom | 428/489 |

OTHER PUBLICATIONS

Offenlegungsschrift, 2,364,394, (W. Germany).

Primary Examiner—William J. Van Balen
Attorney, Agent, or Firm—James Magee, Jr.; J. Gary Mohr

[57] ABSTRACT

This invention pertains to asphaltic sheet sound deadener for use as a vibration damping medium, which can be bonded in place without excessive sag or flow by subjecting the material to 250°–400° F. The main use of this material is in the automotive field, but may be used in other areas such as the appliance and furniture industries. The melt flow properties of the deadener are controlled by the use of ground mica.

1 Claim, 2 Drawing Figures

HEAT BONDABLE ASPHALTIC SOUND DEADENER

This is a continuation of application Ser. No. 905,349, filed May 12, 1978, now abandoned.

BACKGROUND OF THE INVENTION

For the last few years both domestic and foreign automobile manufacturers have been using heat bondable sheet sound deadeners which are placed in the car body prior to the final paint oven. In the oven the sound deadener sheet softens, conforms to the contours of the body and bonds without excessive sag or flow from the sloped or vertical areas. This type of material is also being used in areas where high inservice temperatures (190–400° F.) would result in flowing of standard asphaltic deadeners.

The majority of the heat bondable sound deadener sheets used domestically contain asbestos to control the melt flow properties of the asphalt at elevated temperatures, however, asbestos being a known carcinogen requires special handling thereby complicating the manufacture of the product.

A typical asbestos-containing formula would be:
5% 7R Asbestos
67% Ground Limestone Filler
28% Asphalt Other heat bondable sound deadeners which are available are based on thermoplastic resins such as butadiene-styrene, coumarone-indene, styrene-indene, such as disclosed in British Pat. No. 1,039,711 and Canadian Pat. Nos. 721.237 and 784.029. These compositions, however, tend to be more expensive and more difficult to manufacture than the asbestos-containing sound deadening material.

The main object of the invention is to provide a heat bondable sound deadener sheet which is asbestos-free, inexpensive and can be manufactured using the same equipment as the present asbestos compositions.

SUMMARY OF THE INVENTION

A bituminous sound deadening material which can be bonded in place without excessive sag or flow by subjecting it to temperatures between 250°–400° F. The melt flow properties of the bituminous material are controlled by ground mica mixed into the bituminous material. The bituminous material need not be, but may be covered on one side or both sides with a release paper or preferably a thermoplastic film such as polyethylene to facilitate stacking and shipping of the material by eliminating the possibility of sticking.

DESCRIPTION OF A PREFERRED EMBODIMENT

The sound-deadening material includes an inner layer 1 of sound-deadening material capable of being softened by heat and melt flowing into conformity with a metal panel. A preferred inner layer composition comprises ground mica, which is ideally suited to this application due to its large surface area per unit size, ground lime stone filler and asphalt in the following quantities, 20%, 50% and 30%, respectively.

Wherein the mica has a screen grading of:
0–5% retained on U.S. #60 mesh
5–15% retained on U.S. #80 mesh
10–20% retained on U.S. #100 mesh
30–45% retained on U.S. #200 mesh
25–40% passing a U.S. #200 mesh The ground limestone has a screen grading of:
2% max. retained on U.S. #60 mesh
20% max. retained on U.S. #100 mesh
5–50% retained on U.S. #200 mesh
95% max. passing a U.S. #200 mesh The asphalt has:
Softening Point (R&B)—180°–195° F. (ASTM D36-70)
Penetration @77° F.—50–65 (ASTM D5-73)

Without deviating from the spirit of this invention the formula of this composition could be varied as follows, depending on the grades of material used:
(by wt.) Mica 5–50%
(by wt.) Inert Filler 0–80%
(by wt.) Asphalt 20–80%

Grades of ground mica or mica schist other than #160 could be used, but would require adjustment of the formula within the above limits. The #160 grade was found to be the most effective.

Fillers other than limestone could be used such as ground stone dust, sand, clay, silt, chopped fiber glass, etc. Material of a screen grading other than that given in the limestone example could be used, but to maintain a smooth appearance of the product the majority of the material should pass a U.S. #60 mesh sieve.

Asphalt within a softening point of 85°–260° F. and penetration @77° F. of 5–300 could be used, but to give the optimum product an asphalt with a softening point of 180°–195° F. and penetration @77° F. of 50–65 has been found to be the most suitable.

The inner layer 1 carries on at least one side, a sheet of polyethylene 2, preferably resistant to hydrocarbon solvents and non-tacky so that it does not readily adhere at normal atmospheric temperatures to other surfaces. The polyethylene, however, adheres to the inner layer 1.

When a film 2 of polyethylene or other film-forming resinous material is employed to cover one or two faces of the sound-deadening inner layer 1 it is preferably applied to the sound-deadening sheet as a preformed film or sheet which is laid down on a face of the sound-deadening layer and secured to the sheet by passing the assembly between rollers which press the sheet and layer gently together. Such film may, however, be applied in suitable instances by spray or other coating technique.

Figure 1:
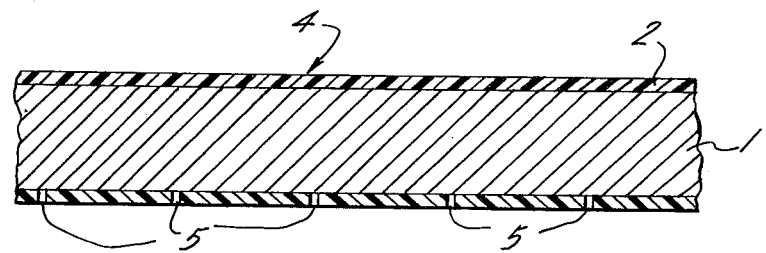
FIG. 1 is a sectional elevational view of a compounded bituminous sheet of sound-deadening material showing protective sheet on both sides.
Figure 2:
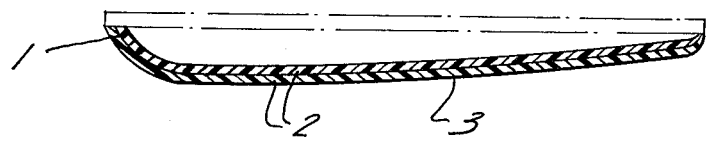
FIG. 2 is a diagrammatic elevational view of a metal panel and sheet sound-deadening material conforming and adhering to the metal panel with the position of the sound-deadening sheet before conforming and adhesion being shown in dashed lines.

In carrying out a procedure illustrative of the invention in its method aspects, a metal panel 3 of a car body is covered by bituminous sheet 4 to reduce its tendency to vibrate, by laying sheet material 4 with either side down, as shown in broken lines in FIG. 2 on an upwardly facing surface of the metal panel 3. The metal panel 3 and sheet material 4 are heated in an oven wherein the sheet material 4 melt flows into close conformity with the surface of the metal panel 3 as shown in solid lines in FIG. 2. If air is trapped between the sheet material 4 and the metal panel 3 it is allowed to escape through optional holes 5 in the sheet 4.

At the temperature reached in automobile paint ovens the sheet 2 of polyethylene composition allows the inner layer 1 to flow onto the panel 3 through the polyethylene sheet 2 which has melted and both the melted polyethylene sheet 2 and inner layer 1 fuses with the surface of the metal panel 3, whereupon cooling, the sheet material 4 is firmly bonded with uniform thickness to the surface of the metal panel 3.

The minimum fusion conditions to give a good bond to clean or painted metal is fifteen minutes in an air convection oven at 250° F. At higher temperatures a good bond is obtainable more rapidly. Fusion temperatures of up to 400° F. are satisfactory, but above this figure degradation of the sound deadening compound can occur.

In applications where an irregular metal surface is used the fusion conditions have to be selected to enable the sound deadening material to droop and make 100% contact. In these cases temperatures in excess of 250° F. may be necessary.

The illustrative material when covered on both sides with a sheet of polyethylene 3, can be provided as pieces of suitable shape and size and stacked for storage and transport without any additional interleaved release paper, and the pieces can readily be separated one from another when they come to be used in a car factory.

When sound-deadening material in accordance with the invention comprises a perforate sheet the holes in the perforate sheet are preferably 1/16" to ⅛" in diameter at centers ¼" to 1" apart (the larger the hole the larger the spacing), but may, if desired, be larger and more widely spaced. When the sound-deadening material is to have a covering of polyethylene sheet 3 and is to comprise a perforate sheet, the sheet is preferably perforated before, but may be perforated after laminating with polyethylene sheet. The polyethylene sheet 3 may, if desired, be provided with narrow, shallow, intersecting grooves (not shown) so that, when that side is laid against a metal panel, air may escape along the grooves. The polyethylene sheet 3 is usually 0.0005 to 0.0020 inches thick with an overall weight of sheet 4 being 0.5 lbs. to 2 lbs. per sq. ft.

In carrying out the illustrative method of treating metal panels 3 of car bodies in a car factory, the pieces of sound-deadening material 4 are taken one by one and laid on upwardly-facing surfaces of metal panels passing along a conveyor to an oven heated to 250°–400° F.

On emerging from the oven, the pieces of material 4 are found to conform to the contour of the panels 3 and to be firmly bonded in place with little or no evidence of degradation.

We claim:

1. An automobile heat contouring sound-deadening material made solely of 30% asphalt, 20% mica and 50% limestone composition secured by the composition to the automobile and having on at least one side of said composition a heat deteriorating polyethylene film.

* * * * *